(12) United States Patent
Spanner et al.

(10) Patent No.: US 9,372,784 B2
(45) Date of Patent: Jun. 21, 2016

(54) TEST SYSTEM CONFIGURATION METHOD AND SYSTEM

(75) Inventors: Andreas Spanner, St. Leonards (AU); David de Vos, Lane Cove (AU)

(73) Assignee: International Business Machines Corporation, Armonk, NY (US)

(*) Notice: Subject to any disclaimer, the term of this patent is extended or adjusted under 35 U.S.C. 154(b) by 975 days.

(21) Appl. No.: 12/389,730

(22) Filed: Feb. 20, 2009

(65) Prior Publication Data

US 2010/0218176 A1 Aug. 26, 2010

(51) Int. Cl.
*G06F 9/44* (2006.01)
*G06F 9/45* (2006.01)
*G06F 11/36* (2006.01)
*G06F 9/445* (2006.01)

(52) U.S. Cl.
CPC ............ *G06F 11/368* (2013.01); *G06F 8/71* (2013.01); *G06F 8/65* (2013.01)

(58) Field of Classification Search
CPC ... G06F 11/1451; G06F 11/1458; G06F 8/63; G06F 8/68
USPC ................................................. 717/168–178
See application file for complete search history.

(56) References Cited

U.S. PATENT DOCUMENTS

| | | | |
|---|---|---|---|
| 6,289,509 B1 | 9/2001 | Kryloff | |
| 7,032,210 B2 | 4/2006 | Alloing et al. | |
| 2003/0218628 A1* | 11/2003 | Deshpande et al. | 345/738 |
| 2006/0048129 A1* | 3/2006 | Napier et al. | 717/168 |
| 2006/0048137 A1* | 3/2006 | Nosseir et al. | 717/174 |
| 2007/0027936 A1* | 2/2007 | Stakutis et al. | 707/204 |
| 2007/0106979 A1* | 5/2007 | Felts | 717/124 |
| 2008/0222375 A1* | 9/2008 | Kotsovinos et al. | 711/162 |

FOREIGN PATENT DOCUMENTS

| | | |
|---|---|---|
| CN | 101101552 A | 1/2008 |
| CN | 101017435 A1 | 8/2008 |
| JP | 02079121 | 3/1990 |

OTHER PUBLICATIONS

Office Action for CN Patent Application No. 201010113533.2 Dated Sep. 29, 2012, pp. 1-8.

* cited by examiner

*Primary Examiner* — Wei Zhen
*Assistant Examiner* — Brahim Bourzik
(74) *Attorney, Agent, or Firm* — Brian J. Colandreo, Esq.; Jeffrey T. Placker, Esq.; Holland & Knight LLP (57) ABSTRACT

This disclosure relates to computer test systems and, more particularly, to automatically configuring computer test systems. A method, computer program product, and system receives a list of one or more software patches installed on an in-field computer system, the list including a version of each of the one or more software patches. Source code, managed by a source code revision tool, corresponding to the version of each of the one or more software patches, is identified. A compiling and installation system compiles one or more newly compiled software patches from the source code managed by the source code revision tool for each of the software patches installed on the in-field computer system. The compiling and installation system automatically installs the one or more newly compiled software patches on a test computer system to replicate the in-field computer system.

24 Claims, 3 Drawing Sheets

TEST SYSTEM CONFIGURATION METHOD AND SYSTEM

TECHNICAL FIELD

This disclosure relates to computer test systems and, more particularly, to automatically configuring computer test systems.

BACKGROUND

Software and computer systems installed in the field can often break down due to software bugs or configuration problems. A service team may have to send a service technician to the site to diagnose and fix the problem. However, on-site service calls can be costly. It may be easier and less expensive to replicate the in-field computer system on a local test system.

Replicating the in-field computer system may be difficult especially if the configuration is complex or the in-field computer is remote. Many computer systems have multiple software products and software patches installed. The software products and software patches may be configured improperly, may be incompatible with each other, or may contain bugs. To complicate things further, each software product and software patch may have more than one version. To properly replicate the in-field system and properly diagnose the problem, a technician may have to install the correct version of each software product and software patch on a test computer system. Additionally, the software products and patches may require a specific order of installation. Also, the correct software product and patch installations may not be available for installation; they may exist only in the form of un-compiled source code.

Replicating an in-field computer system by manually installing software products and patches on a test system is costly, time consuming, and error prone. A system that automatically replicates an in-field computer system may reduce the cost, time, and error associated with diagnosing problems with the in-field computer system.

SUMMARY OF DISCLOSURE

In an embodiment, a method of configuring a test system includes receiving a list of one or more software patches installed on an in-field computer system. The list includes a version of each of the one or more software patches. The method identifies source code, managed by a source code revision tool, corresponding to the version of each of the one or more software patches. A compilation and installation system automatically compiles one or more newly compiled software patches from the source code managed by the source code revision tool for each of the software patches installed on the in-field computer system. The compilation and installation system also installs the one or more newly compiled software patches on a test computer system to replicate the in-field computer system.

One or more of the following features may be included. The list of one or more software patches may be created or appended by installation of the one or more software patches on the in-field computer system. The list of one or more software patches installed on an in-field computer system may also include a list of one or more software applications installed on the in-field computer system. Identifying the source code may include matching the versions of each of the one or more software patches with a naming convention of the source code, or matching the versions of each of the one or more software patches with source code having a unique identifier.

Automatically compiling the one or more newly compiled software patches may include compiling prerequisites software patches required by the one or more newly compiled software patches. Automatically installing the one or more newly compiled software patches may include installing the one or more prerequisite software patches required by the one or more newly compiled software patches.

The method may also determine an installation order of the newly compiled software packages. The installation order may be based on a delivery date of the source code, an identifier of a change set of the source code, an identifier of the one or more newly compiled software patches, an identifier of the one or more software patches installed on the in-field computer system, and/or information from a registry file located on the in-field computer system.

In another embodiment, a computer program product resides on a computer readable medium, having a plurality of instructions stored thereon, which, when executed by a processor, cause the processor to perform operations including receiving a list of one or more software patches installed on an in-field computer system. The list includes a version of each of the one or more software patches. The operations identify source code, managed by a source code revision tool, corresponding to the version of each of the one or more software patches. The operations automatically compile one or more newly compiled software patches from the source code managed by the source code revision tool for each of the software patches installed on the in-field computer system. The operations also install the one or more newly compiled software patches on a test computer system to replicate the in-field computer system.

One or more of the following features may be included. The list of one or more software patches may be created or appended by installation of the one or more software patches on the in-field computer system. The list of one or more software patches installed on an in-field computer system may also include a list of one or more software applications installed on the in-field computer system. Identifying the source code may include matching the versions of each of the one or more software patches with a naming convention of the source code or matching the versions of each of the one or more software patches with source code having a unique identifier.

Automatically compiling the one or more newly compiled software patches may include compiling prerequisites software patches required by the one or more newly compiled software patches. Automatically installing the one or more newly compiled software patches may include installing the one or more prerequisite software patches required by the one or more newly compiled software patches.

The operations may also include determining an installation order of the newly compiled software packages. The installation order may be based on a delivery date of the source code, an identifier of a change set of the source code, an identifier of the one or more newly compiled software patches, an identifier of the one or more software patches installed on the in-field computer system, and/or information from a registry file located on the in-field computer system.

In another embodiment, a system includes at least one processor, at least one memory architecture coupled with the at least one processor, and one or more sets of software instructions that perform operations including receiving a list of one or more software patches installed on an in-field computer system. The list includes a version of each of the one or more software patches. The operations identify source code, managed by a source code revision tool, corresponding to the version of each of the one or more software patches. The operations automatically compile one or more newly compiled software patches from the source code managed by the source code revision tool for each of the software patches installed on the in-field computer system. The operations also install the one or more newly compiled software patches on a test computer system to replicate the in-field computer system.

One or more of the following features may be included. The list of one or more software patches may be created or appended by installation of the one or more software patches on the in-field computer system. The list of one or more software patches installed on an in-field computer system may also include a list of one or more software applications installed on the in-field computer system. Identifying the source code may include matching the versions of each of the one or more software patches with a naming convention of the source code or matching the versions of each of the one or more software patches with source code having a unique identifier.

Automatically compiling the one or more newly compiled software patches may include compiling prerequisites software patches required by the one or more newly compiled software patches Automatically installing the one or more newly compiled software patches may include installing the one or more prerequisite software patches required by the one or more newly compiled software patches.

The operations may also include determining an installation order of the newly compiled software packages. The installation order may be based on a delivery date of the source code, an identifier of a change set of the source code, an identifier of the one or more newly compiled software patches, an identifier of the one or more software patches installed on the in-field computer system, and/or information from a registry file located on the in-field computer system.

The details of one or more implementations are set forth in the accompanying drawings and the description below. Other features and advantages will become apparent from the description, the drawings, and the claims.

BRIEF DESCRIPTION OF THE DRAWINGS

Like reference designators in the figures denote like elements.

DETAILED DESCRIPTION OF THE PREFERRED EMBODIMENTS

Figure 1:
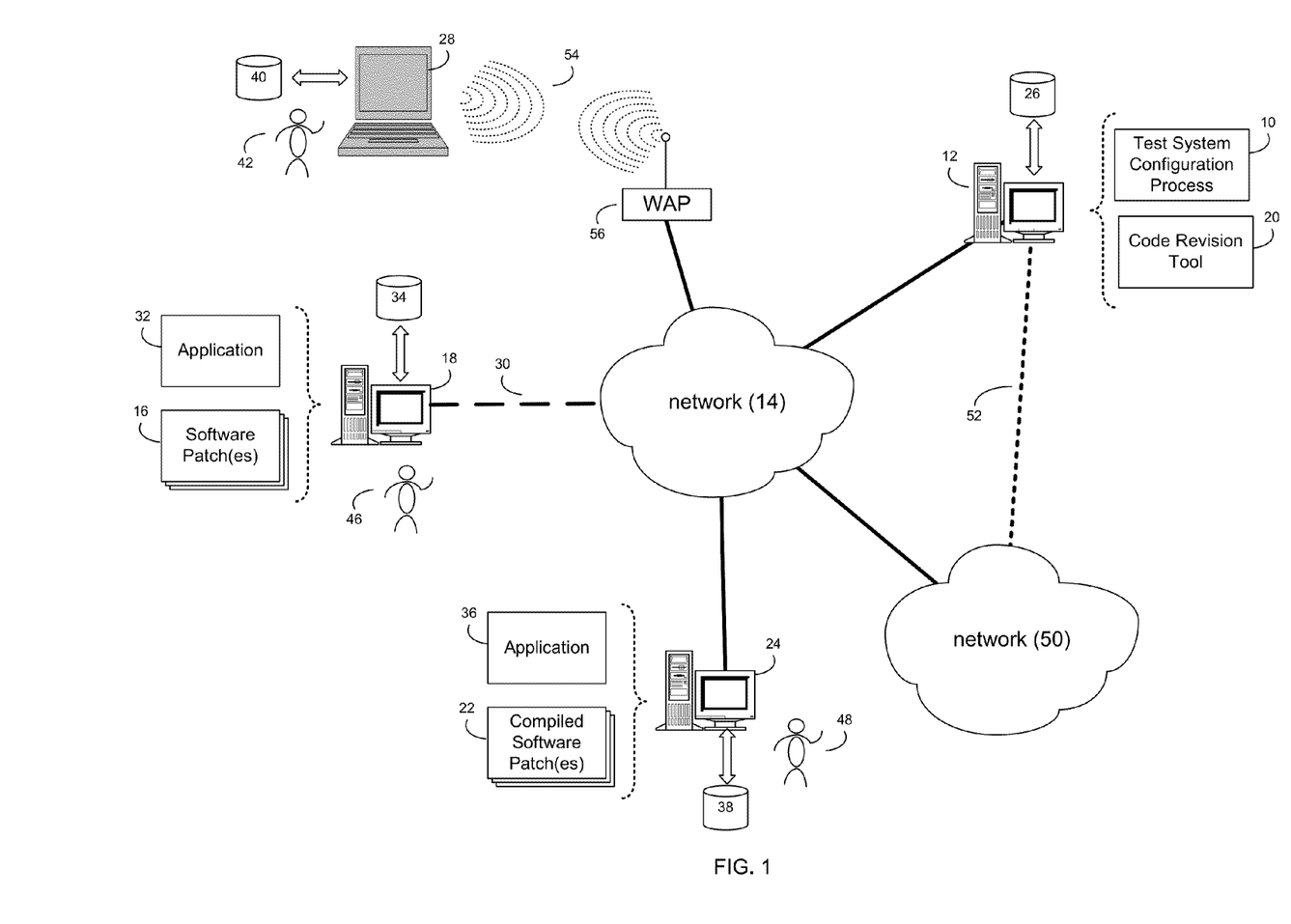
FIG. 1 is a diagrammatic view of a test system configuration process coupled to a distributed computing network.

System Overview:

FIG. 1 depicts test system configuration process 10, which may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell Netware®; or Redhat® Linux®, for example (Microsoft and Windows are trademarks of Microsoft Corporation in the United States, other countries, or both; Novell and NetWare are trademarks or registered trademarks of Novell Corporation in the United States, other countries, or both; Red Hat is a trademark or registered trademark of Red Hat Corporation in the United States, other countries, or both; and Linux is a registered trademark of Linus Torvalds in the United States, other countries, or both).

As will be discussed below in greater detail, test system configuration process 10 may receive a list of one or more software patches 16 installed on in-field computer system 18. The list may include a version of each of the one or more software patches installed on in-field computer system 18. Test system configuration process 10 may also identify source code, managed by source code revision tool 20, corresponding to the version of each of the one or more software patches 16. Test system configuration 10 may automatically compile one or more newly compiled software patches 22 from the source code managed by source code revision tool 20 for each of the software patches 16 installed on in-field computer system 18. Test system configuration process 10 may also install the one or more newly compiled software patches 22 on test computer system 24 to replicate in-field computer system 18.

The instruction sets and subroutines of test system configuration process 10, which may include one or more software modules and one or more sets of software instructions, and which may be stored on storage device 26 coupled to server computer 12, may be executed by one or more processors (not shown) and one or more memory architectures (not shown) incorporated into server computer 12. Storage device 26 may include but is not limited to: a hard disk drive; a solid state drive; a tape drive; an optical drive; a RAID array; a random access memory (RAM); and a read-only memory (ROM).

The instruction sets and subroutines of test system configuration process 10 may be generated through the use of a compiler, such as the IBM® XL compiler, the Visual Studio® compiler, or an assembler, for example (IBM is a trademark or registered trademark of International Business Machines Corporation in the United States, other countries, or both; Visual Studio is a registered trademark of Microsoft Corporation in the United States, other countries, or both). The instruction set and subroutines may also be generated as scripts, such as JavaScript® scripts, or as other types of software code (Java and all Java-based trademarks and logos are of Sun Microsystems, Inc. in the United States, other countries, or both). In general, and as is known in the art, the instruction set and subroutines of test system configuration process 10 may be generated via any method of generating instruction sets and subroutines that may be executed by a processor.

Server computer 12 may also execute code revision tool 20, examples of which include the ClearCase® configuration management tool (ClearCase is a trademark or registered trademark of International Business Machines in the United States, other countries, or both). Code revision tool 20 may allow an organization to track and maintain software code revisions and changes during the software development process. As will be discussed below in greater detail, test system configuration process 10 may identify source code managed by code revision tool 20 corresponding to software patches 16.

Code revision tool 20 may be stored on storage device 26 coupled to server computer 12. Although shown as a server application, code revision tool 22 may also be a client application (executed by laptop 28, for example), or a client/server application executed by one or more computing devices.

In-field computer system 18 may be a local or remote computer system. It may be coupled to network 14 as shown by dotted line 30, or it may be a stand-alone computer system that is not coupled to a network. In-field computer system may be a laptop system, a desktop system, a server system, or a series of computer systems, for example. In-field computer system 18 may also be located at a remote site such as a customer's facility. If in-field computer system 18 has a software or configuration problem, test system configuration process 10 may replicate the configuration of in-field computer system 18 on test computer system 24, which may be located at a local site.

Application 32 may be a software application (i.e. a software product) installed on and executed by in-field computer system 18. Application 32 may be stored on storage device 34, coupled to in-field computer system 18. Application 32 may be any type of software product(s) that a software development company can develop, use, sell, or deploy. Various software patches 16 that update or modify application 32 may also be installed on computer 18. These software patches 16 may provide various updates and fixes to application 32.

Test computer system 24 may be a computer system or series of computer systems used to test the configuration of in-field computer system 18, for example. Test computer system 24 may execute application 36, which may be the same application (or applications) as application 32. For example, if application 32 is a business application installed on in-field computer system 18, application 36 may be the same business application, but installed on test computer system 24. Application 36 may be stored on storage device 38 coupled to test computer system 24. Test system configuration process 10 may install compiled software patches 22 on test computer system 24 in order to replicate the configuration of in-field computer system 18 on test computer system 24.

Storage devices 26, 34, 38, 40 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices.

Various client electronic devices may be coupled to network 14. Examples of client electronic devices may include, but are not limited to: server computer 12, laptop 28, in-field computer system 18, test computer system 24, a personal digital assistant (not shown), a data-enabled, cellular telephone (not shown), and a dedicated network device (not shown). Users 42, 46, 48 may access the various tools and applications, such as test system configuration process 10 or code revision tool 20 from any device connected to network 14 or directly from the device on which the tool or application resides. Client electronic devices may be coupled directly to network 14, or may be indirectly coupled to network 14 through network 50. For example, server 12 may be indirectly connect to network 14 through secondary network 50, as illustrated by phantom link line 52.

The various client electronic devices may be directly or indirectly coupled to network 14 (or network 50). For example, test computer system 24 is shown directly coupled to network 14 via a hardwired network connection. Further, server 12 is shown directly coupled to network 14 via a hardwired network connection. Laptop 28 is shown wirelessly coupled to network 14 via wireless communication channel 54 established between laptop 28 and wireless access point (i.e., WAP) 56, which is shown directly coupled to network 14. WAP 56 may be, for example, an IEEE 802.11a, 802.11b, 802.11g, Wi-Fi, and/or Bluetooth device that is capable of establishing wireless communication channel 48 between laptop 28 and WAP 56.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 12, 24, 18, 28 may each execute an operating system, examples of which may include but are not limited to Microsoft Windows, Redhat Linux, or a custom operating system.

Test System Configuration Process

Figure 2:
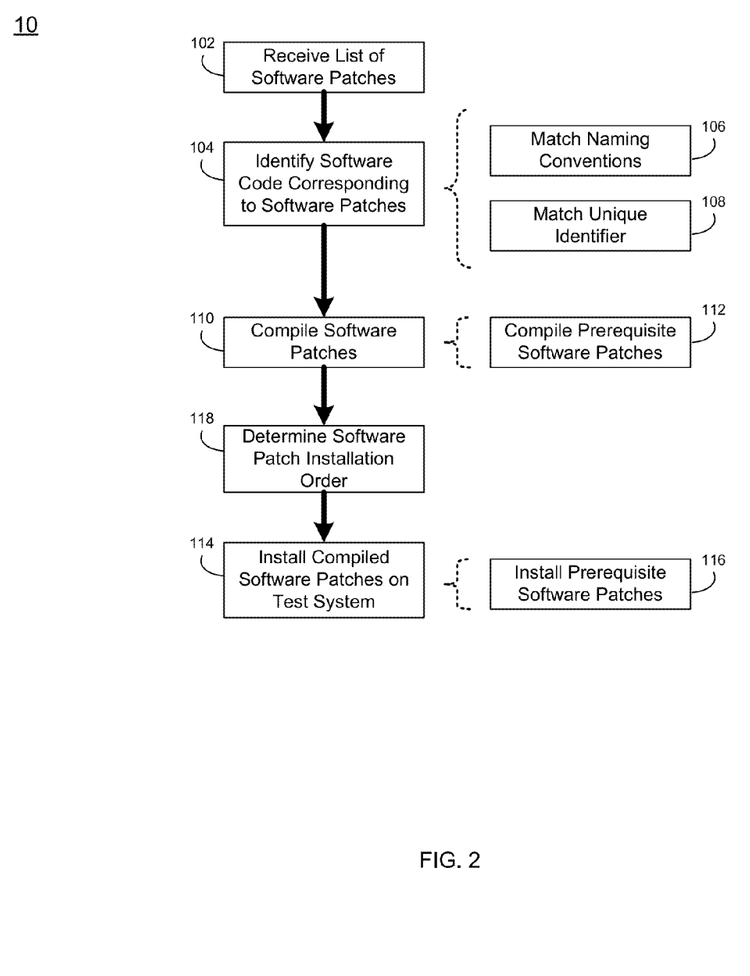
FIG. 2 is a flowchart of the test system configuration process of FIG. 1.

Referring to FIG. 2, test system configuration process 10 may receive 102 a list of software patches installed on in-field computer system 18. The list of software patches may also include a version of each of the one or more software patches. For example, if in-field computer system 18 has three patches installed, the list of software patches may identify the three patches installed on in-field computer system 18 and may also identify which version of each patch is installed.

The list of software patches may be generated in various ways. The list may, for example, be a file that is created or appended whenever a software patch is installed on in-field computer system 18. For example, if a user installs a hypothetical patch X on in-field computer system 18, the installation process may append a file that contains the list of installed software patches by adding patch X to the list. The file containing the list of installed software patches may be any file on in-field computer system 18: the file may be a text file, a binary file, a registry file, etc. The list of software patches installed on in-field computer system 18 may also reside on another computer system, file system, or in a database.

Alternatively, in-field test system 18 and/or test system configuration process 10 may generate the list of software patches installed on in-field test system 18 by querying in-field test system 18. For example, in-field test system 18 may execute a process that keeps track of and reports the software patches installed on in-field test system 18. Alternatively, in-field test system 18 or test system configuration process 10 may generate the list of installed software patches by searching a registry or file system on in-field test system 18. The search process may scan the registry or the file system for registry keys or files associated with software patches and, if those keys or files are found, add the associated software patch to the list of installed software patches.

The list of software patches may also include a list of applications installed on in-field computer system 18. For example, the list of software patches may include application 30 or any other application installed on in-field computer system 18.

Code revision tool 20 may maintain versions of source code files created during software development. For example, code revision tool 20 may maintain some or all of the versions of source code files used to compile software patches 16.

Once test system configuration process 10 receives 102 the list of software patches installed on in-field computer system 18, test system configuration process 10 may identify 104 the source code files managed by code revision tool 20 that correspond to each of the software patches in the list. The source code files corresponding to patch X, for example, may be the source code files that were used to compile patch X.

The source code files may have identifiers or tags that associate the source code files with particular software patches. For example, if hypothetical software patch X was compiled from a particular set of source code files, each file within that particular set of source code files may have a tag or identifier indicating that the file was used to compile patch X. The tag or identifier may take various forms. For example, each file used to compile patch X may employ a naming convention that associates each file with patch X. In this case, test system configuration process 10 may match 106 the source code and software patch having the same naming convention. Alternatively, code revision tool 20 may store metadata that tags or identifies each file used to compile patch X. For example, the software patch and source may be tagged with a unique identifier. In this case, test system configuration process 10 may match 108 the source code and software patch having the same unique identifier. In general, any mechanism that associates versions of source code with a software patch may be used to identify the source code used to compile a software patch.

Code revision tool 20 may also contain other types of files corresponding to software patches. For example, code revision tool 20 may contain script files, text files, binary files, or any other type of file required to create or compile software patches.

Once test system configuration process 10 identifies 104 source code and/or other files corresponding to software patches, it may automatically compile 110 one or more newly compiled software patches 22 from the source code for each of the software patches installed on the in-field computer system. If, for example, test system configuration process 10 receives 102 a list of software patches, test system configuration process 10 may identify 104 source code managed by code revision tool 20 for each of the software patches. Then, for each of the software patches in the list of software patches, test system configuration process 10 may compile 110 the source code corresponding to each software patch. The result of each compilation 110 may be a newly compiled software patch 22 that matches the version of the original software patch 16 installed on in-field computer system 18. Compilation 110 of the software patches may be performed by any software compiler, examples of which include the IBM XL compiler, the Visual Studio compiler, or a custom compiler. Additionally/alternatively, the source code may be script code, assembler code, or any other sort of software code. Accordingly, compiling 110 the software patches may include gathering of appropriate script code, assembly of assembly code, etc. In general, the compilation 110 of compiled software patches 22 may be performed via any form of compiling a software module.

Test system configuration process 10 may also identify 104 and compile 112 any software patches that are prerequisites of the software patches 16 installed on in-field computer system 18. One method of identifying requisite software patches is described in U.S. patent application Ser. No. 12/346,165 (filed Dec. 30, 2008) entitled "System and Method for Detecting Software Patch Dependencies," which is incorporated here by reference in its entirety. Other methods of identifying requisite software patches may also be used.

Once any prerequisite software patches are identified, test system configuration process 10 may also identify 104 source code corresponding to the prerequisite software patches, and may also compile 112 the prerequisite software patches. Test system configuration process 10 may identify 104 the source code for the prerequisite patches and compile 112 the prerequisite patches in manner like that described above, for example.

Once test system configuration process 10 compiles 110, 112 newly compiled software patches 22, test system configuration process 10 may install 114, 116 one or more newly compiled software patches 22 on test computer system 24 system to replicate the configuration of in-field computer system 18. Installing 114, 116 the newly compiled software patches 22 on test computer system 24 may include installing 116 any newly compiled prerequisite software patches.

Test system configuration process 10 may install newly compiled software patches 22 in various ways. The method of installation may depend upon the software patch. For example if a software patch includes its own installation code, test system configuration process 10 may launch the software patch's installation code on test computer system 24. Alternatively, if a software patch requires only that files be copied onto the target machine, test system configuration process 10 may copy the appropriate files to the appropriate location on test computer system 24. As is known in the art, software may be installed in various ways. Accordingly, test system configuration process 10 may initiate the appropriate installation process for each newly compiled software patch 22 so that each newly compiled software patch 22 is installed 114, 116 on test computer system 24.

In order to accurately replicate the configuration of in-field computer 18, newly compiled software patches 22 may require a particular installation order. For example, if software patches 16 were installed on in-field computer 18 in a particular order, test system configuration process 10 may require the same order of installation 114, 116 of newly compiled software patches 22 to obtain an accurate replication of the configuration of in-field computer system 18. Accordingly, test system configuration process 10 may determine an installation order of newly compiled software packages 22, and may install 114, 116 newly compiled software patches 22 on test computer system 24 according to the installation order.

Test system configuration process 10 may determine 118 the installation order in various ways. For example, the installation order may be based on the delivery date or release date of software patches 22 or the source code used to compile software patches 22. The earlier the delivery or release date for a particular software patch, the earlier that software patch may be installed. Test system configuration process 10 may also determine the installation order via an identifier of a change set of the source code. The source code managed by code revision tool 20 may contain metadata. A set of changes to various source code files within code revision tool 20 may include a metadata identifier. The metadata identifier may indicate the order in which a software patch associated with the change set should be installed. For example, the metadata identifier may indicate that hypothetical patch Y should be installed only after hypothetical patch X is installed. Accordingly, test system configuration process 10 may install newly compiled software patches 22 in an order specified by metadata of a software change set. Additionally or alternatively, newly compiled software patches 22 or software patches 16 (installed on in-field computer system 18) may include identifiers that specify an installation order. As another alternative, test system configuration process 10 may retrieve an installation order from a registry file located on in-field computer system 18, or from the list of software patches received 102 from in-field computer system 18. The registry file may include a date and time that each software patch was installed. Test system configuration process 10 may then install 114, 116 newly compiled software patches 22 in an order corresponding to the date and time listed in the registry file of in-field computer system 18.

Figure 3:
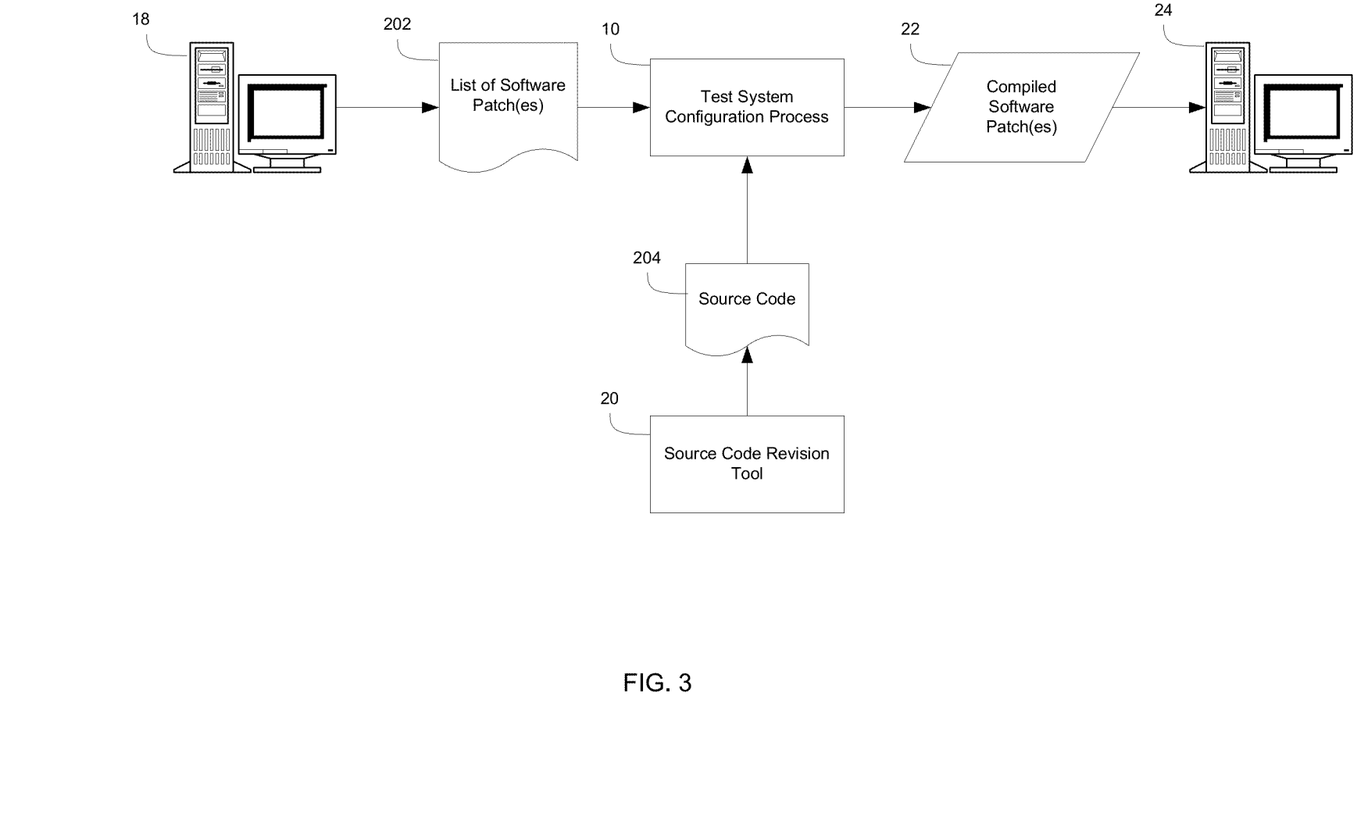
FIG. 3 is a flowchart of a data and information flow of the test system configuration process of FIG. 1.

Referring also to FIG. 3, FIG. 3 shows a block diagram of test system configuration process 10. Test system configuration process 10 receives 102 list of software patches 202 from in-field computer system 18. As discussed, list of software patches 202 may include a list of software patches 16 installed on in-field computer system 18, a list of any other applications 32 installed on in-field computer system 18, an installation order of software patches 16, and any other metadata associated with software patches 16.

Test system configuration process 10 may then identify 104 source code managed by code revision tool 20 that corresponds to software patches 16, as discussed above. Once source code 204 is identified, test system configuration process 10 may compile 110, 112 source code 204 to create compiled software patches 22. Test system configuration process 10 may then determine 118 an installation order for compiled software patches 22, and install 114, 116 compiled software patches 22 on test computer system 24 to replicate the configuration of in-field computer system 18 on test computer system 24.

The method, system, and computer program may be used in various ways. For example, once the configuration of in-field computer system 18 is replicated on test computer system 24, a technician may be able to diagnose a problem or bug that is occurring on in-field computer system 18 without traveling to the site of in-field computer system 18. The technician may be able to diagnose the problem occurring on in-field computer system 18 by experimenting with test computer system 24, for example.

A number of implementations have been described. Nevertheless, it will be understood that various modifications may be made. Accordingly, other implementations are within the scope of the following claims.

What is claimed is:

1. A method of configuring a test system comprising:
requesting from an in-field computer system, a list of one or more software patches installed on the in-field computer system, the list including a version of each of the one or more software patches, wherein the list of one or more software patches includes a list of all applications installed on the in-field computer system;
receiving the list of one or more software patches installed on the in-field computer system;
identifying source code, managed by a source code revision tool, corresponding to the version of each of the one or more software patches on the list by matching the source code to the one or more software patches via a unique identifier associated with each source code file and each of the one or more software patches, wherein the unique identifier identifies which source code file was used to compile at least one software patch of the one or more software patches on the list;
automatically compiling, on a compiling and installation system, one or more newly compiled software patches from the source code managed by the source code revision tool for each of the software patches on the list;
determining an installation order of the one or more newly compiled software patches, including ordering the one or more newly compiled software patches via a metadata identifier included within a set of changes to source code files within the source code revision tool and an identifier of the one or more software patches installed on the in-field computer system, wherein the metadata identifier specifies the installation order; and
automatically installing, by the compiling and installation system, the one or more newly compiled software patches on the test computer system to identically replicate the in-field computer system wherein the one or more newly compiled software patches are automatically installed on the test computer system in a same order of installation as the in-field computer system.

2. The method of claim 1 wherein the list of one or more software patches is created or appended by installation of the one or more software patches on the in-field computer system.

3. The method of claim 1 wherein identifying source code includes matching the versions of each of the one or more software patches with a naming convention of the source code.

4. The method of claim 1 wherein:
automatically compiling one or more newly compiled software patches includes automatically compiling one or more prerequisite software patches required by the one or more newly compiled software patches; and
automatically installing the one or more newly compiled software patches includes automatically installing the one or more prerequisite software patches required by the one or more newly compiled software patches.

5. The method of claim 1 wherein determining an installation order includes ordering the one or more newly compiled software patches by one or more of:
a delivery date of the source code;
an identifier of the one or more newly compiled software patches; and information from a registry file located on the in-field computer system.

6. The method of claim 1 wherein the list of one or more software patches installed on an in-field computer system includes a list of one or more software applications installed on the in-field computer system.

7. A computer program product residing on a non-transitory computer readable medium, having a plurality of instructions stored thereon, which, when executed by a processor, cause the processor to perform operations comprising:
requesting from an in-field computer system, a list of one or more software patches installed on the in-field computer system, the list including a version of each of the one or more software patches, wherein the list of one or more software patches includes a list of all applications installed on the in-field computer system;
receiving the list of one or more software patches installed on the in-field computer system;
identifying source code, managed by a source code revision tool, corresponding to the version of each of the one or more software patches on the list by matching the source code to the one or more software patches via a unique identifier associated with each source code file and each of the one or more software patches, wherein the unique identifier identifies which source code file was used to compile at least one software patch of the one or more software patches on the list;
automatically compiling, on a compiling and installation system, one or more newly compiled software patches from the source code managed by the source code revision tool for each of the software patches on the list;
determining an installation order of the one or more newly compiled software patches, including ordering the one or more newly compiled software patches via a metadata identifier included within a set of changes to source code files within the source code revision tool and an identifier of the one or more software patches installed on the in-field computer system, wherein the metadata identifier specifies the installation order; and automatically installing, by the compiling and installation system, the one or more newly compiled software patches on the test computer system to identically replicate the in-field computer system wherein the one or more newly compiled software patches are automatically installed on the test computer system in a same order of installation as the in-field computer system.

8. The computer program product of claim 7 wherein the list of one or more software patches is created or appended by installation of the one or more software patches on the in-field computer system.

9. The computer program product of claim 7 wherein identifying source code includes matching the versions of each of the one or more software patches with a naming convention of the source code.

10. The computer program product of claim 7 wherein:
automatically compiling one or more newly compiled software patches includes automatically compiling one or more prerequisite software patches required by the one or more newly compiled software patches; and
automatically installing the one or more newly compiled software patches includes automatically installing the one or more prerequisite software patches required by the one or more newly compiled software patches.

11. The computer program product of claim 7 wherein determining an installation order includes ordering the one or more newly compiled software patches by one or more of:
a delivery date of the source code;
an identifier of the one or more newly compiled software patches; and information from a registry file located on the in-field computer system.

12. The computer program product of claim 7 wherein the list of one or more software patches installed on an in-field computer system includes a list of one or more software applications installed on the in-field computer system.

13. A computing system comprising:
at least one processor;
at least one memory architecture coupled with the at least one processor a first set of software instructions executed on the at least one processor and the at least one memory architecture configured to:
request from an in-field computer system, a list of one or more software patches installed on the in-field computer system, the list including a version of each of the one or more software patches, wherein the list of one or more software patches includes a list of all applications installed on the in-field computer system;
a second set of software instructions executed the at least one processor and the at least one memory architecture configured to receive the list of one or more software patches installed on the in-field computer system;
a third set of software instructions executed on the at least one processor and the at least one memory architecture configured to identify source code, managed by a source code revision tool, corresponding to the version of each of the one or more software patches on the list by matching the source code to the one or more software patches via a unique identifier associated with each source code file and each of the one or more software patches, wherein the unique identifier identifies which source code file was used to compile at least one software patch of the one or more software patches on the list;
a fourth set of software instructions executed on the at least one processor and the at least one memory architecture configured to automatically compile one or more newly compiled software patches from the source code managed by the source code revision tool for each of the software patches on the list;

a fifth set of software instructions executed on the at least one processor and the at least one memory architecture configured to determining an installation order of the one or more newly compiled software patches, including ordering the one or more newly compiled software patches via a metadata identifier included within a set of changes to source code files within the source code revision tool and an identifier of the one or more software patches installed on the in-field computer system, wherein the metadata identifier specifies the installation order; and a sixth set of software instructions executed on the at least one processor and the at least one memory architecture configured to automatically install the one or more newly compiled software patches on the test computer system to identically replicate the in-field computer system, wherein the one or more newly compiled software patches are automatically installed on the test computer system in a same order of installation as the in-field computer system.

14. The computing system of claim 13 wherein the list of one or more software patches is created or appended by installation of the one or more software patches on the in\-field computer system.

15. The computer system of claim 13 wherein identifying source code includes matching the versions of each of the one or more software patches with a naming convention of the source code.

16. The computer system of claim 13 wherein:
automatically compiling one or more newly compiled software patches includes automatically compiling one or more prerequisite software patches required by the one or more newly compiled software patches; and
automatically installing the one or more newly compiled software patches includes automatically installing the one or more prerequisite software patches required by the one or more newly compiled software patches.

17. The computer system of claim 13 wherein determining an installation order includes ordering the one or more newly compiled software patches by one or more of:
a delivery date of the source code;
an identifier of the one or more newly compiled software patches; and information from a registry file located on the in-field computer system.

18. The computer system of claim 13 wherein the list of one or more software patches installed on an in-field computer system includes a list of one or more software applications installed on the in-field computer system.

19. The method of claim 1 further comprising:
generating a list of one or more software patches installed on an in-field computer system.

20. The method of claim 19 wherein generating the list of one or more software patches installed on an in-field computer system includes:
searching a registry of the in-field computer system for registry keys associated with the one or more software patches; and
adding the one or more software patches to the list based upon, at least in part, finding the registry keys associated with the one or more software patches in the registry of the in-field computer system.

21. The method of claim 7 further comprising:
generating a list of one or more software patches installed on an in-field computer system.

22. The method of claim 21 wherein generating the list of one or more software patches installed on an in-field computer system includes:
   searching a registry of the in-field computer system for registry keys associated with the one or more software patches; and
   adding the one or more software patches to the list based upon, at least in part, finding the registry keys associated with the one or more software patches in the registry of the in-field computer system.

23. The method of claim 13 further comprising:
   generating a list of one or more software patches installed on an in-field computer system.

24. The method of claim 23 wherein generating the list of one or more software patches installed on an in-field computer system includes:
   searching a registry of the in-field computer system for registry keys associated with the one or more software patches; and
   adding the one or more software patches to the list based upon, at least in part, finding the registry keys associated with the one or more software patches in the registry of the in-field computer system.

\* \* \* \* \*